United States Patent Office 3,733,350
Patented May 15, 1973

3,733,350
LOW OUTGASSING POLYDIMETHYLSILOXANE MATERIAL AND PREPARATION THEREOF
Benjamin Seidenberg, Baltimore, Md., assignor to the United States of America as represented by the Administrator of the National Aeronautics and Space Administration
No Drawing. Filed Feb. 15, 1972, Ser. No. 226,551
Int. Cl. C08f 11/04
U.S. Cl. 260—46.5 R    7 Claims

ABSTRACT OF THE DISCLOSURE

A fluid polydimethylsiloxane resin having improved outgassing properties in cured state consisting essentially of: a first polydimethylsiloxane oligomer having a weight average molecular weight, $\bar{M}_w$, of about 1800 to 2900 and a number average molecular weight, $\bar{M}_n$, of about 1500 to 2500; a second polydimethylsiloxane oligomer having a weight average molecular weight, $\bar{M}_w$ of about 10,000 to 12,000 and a number average molecular weight $\bar{M}_n$ of 19,500 to 21,500; and a third polydimethylsiloxane oligomer having a weight average molecular weight, $\bar{M}_w$, of about 1,780,000 to 1,800,000 and a number average molecular weight, $\bar{M}_n$, of about 850,000 to 870,000.

The fluid polydimethylsiloxane resin of the invention is obtained by pouring to a height of up to about 2 inches a starting polydimethylsiloxane resin such as General Electric Company's RTV-602 silicone resin and devolatilizing the starting resin at a temperature of about 125 to 150° C. under a vacuum of at least $10^{-5}$ torr.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

Field of the invention

This invention relates to a polydimethylsiloxane resin having improved outgassing properties in cured state and to a method for its manufacture.

Description of the prior art

The outgassing of materials under vacuum is a well acknowledged problem particularly when the materials are employed in an aerospace environment. Materials such as paints, coating compositions, adhesives, potting compounds, sealants and the like, although perfectly adequate for use in a terrestrial environment, cannot be used in an aerospace environment because the materials tend to volatilize or outgas during thermal/vacuum testing. Consequently, whether in laboratory exposures or in actual space flights, such outgassing tends to contaminate the spacecraft or the experiments on the spacecraft that are critical from an optics viewpoint or from the viewpoint of electrical functioning or corona formation in high voltage areas. For example, if low molecular weight constituents of materials outgas in an aerospace environment, they can condense on cold optical surfaces. The condensate can polymerize due to exposure to ultraviolet light radiation below 4000 A° or by virtue of low energy protons. Either of these conditions can drastically reduce lens transmission or mirror reflectance. Also, outgassing of polymeric materials in areas of high voltage supplies can lead under some circumstances to corona and electrical failure.

A few polymeric materials such as Dow Corning's 93-500 silicone and various epoxy compounds do exist which provide low thermal/vacuum outgassing characteristics. Dow Corning 93-500 silicone, however, does have one drawback that it must be applied in relatively thick coats on the order of 10 mils or greater before it will cure. The epoxy compounds, on the other hand, have a relatively high hardness, being generally non-flexible. Some of these epoxy compounds further do not cure at ambient temperatures and must be heated or baked at elevated temperatures after application in order to achieve the cross-linking necessary to provide an applied product exhibiting low outgassing characteristics. All of these prior art materials are products of extensive research, exotic starting materials and/or complex techniques, and therefore lead to very expensive formulations.

SUMMARY OF THE INVENTION

An object of the invention, therefore, is to provide a polydimethylsiloxane resin which, upon curing, exhibits low outgassing characteristics and also to provide a method for its preparation.

Another object of the invention is to provide a polymeric material which need not be heated or baked at elevated temperatures to achieve the desired low outgassing characteristics.

A further object of the invention is to provide a polydimethylsiloxane resin which need not be applied in a thick layer before it can be cured.

Yet another object of the invention is to provide a polymeric material exhibiting low outgassing characteristics cheaply and in volume from readily available materials which themselves do not have acceptable low outgassing characteristics.

Another object of the invention is to provide articles of manufacture suitable for use in an aerospace environment comprising substrates having on a portion thereof a layer of the novel polydimethylsiloxane resin of the invention.

As a preferred embodiment of the invention, it is an object of the invention to provide a polydimethylsiloxane resin exhibiting, upon curing, a weight loss of less than 1% by weight when the cured product is tested at 125° C. for 24 hours in a vacuum of $10^{-6}$ torr or better with the condensation of the volatile materials not exceeding 0.1% by weight of the starting material when condensed on a collector plate at 25° C. within the vacuum system.

These and other objects of the invention will be apparent from the description that follows.

DESCRIPTION OF THE INVENTION

The aforementioned and other objects of the invention are obtained by a fluid polydimethylsiloxane resin consisting essentially of three polydimethylsiloxane oligomers: a first oligomer having a weight average molecular weight, $\bar{M}_w$, of about 1800 to 2900 and a number average molecular weight, $\bar{M}_n$ of about 1500 to 2500; a second oligomer having a weight average molecular weight, $\bar{M}_w$, of about 10,000 to 12,000 and number average molecular weight, $\bar{M}_n$, of about 19,500 to 21,500; and a third oligomer having a weight average molecular weight, $\bar{M}_w$ of about 1,780,000 to 1,800,000 and a number average molecular weight, $\bar{M}_n$, of about 850,000 to 870,00. The novel polydimethylsiloxane resins of the invention are further characterized in being essentially free of volatile terminal vinyl group-containing materials and by having a viscosity at 25 degrees C. which falls in the range of about 1,500 to 4,000 centipoises.

As used in this specification and the appended claims, "weight average molecular weight, $\bar{M}_w$," and "number average molecular weight, $\overline{M}_n$," are defined respectively, by the following equations:

$$\overline{M}w = \frac{\sum N_i M_i^2}{\sum N_i M_i} \quad (1)$$

and $$\overline{M}n = \frac{\sum M_i N_i}{\sum N_i} \quad (2)$$

where:

$N_i$ is the number of moles of each molecular species and $M_i$ is the molecular weight of the species. Both $\overline{M}_w$ and $\overline{M}_n$ are determined by Gel Permeation Chromatography.

When the polydimethylsiloxane resin of the invention is cured at room temperature, using any one of the common primary amine curing agents (such as General Electric Company's SRC–05 and SRC–04) for this type of polydimethylsiloxane, a cured product is obtained having a low outgassing profile. The outgassing profile consists of a total weight loss of less than 1%, most often about 0.305 to 0.404%, and a condensation of the volatile materials of about 0.01–0.05% by weight of the starting material. It is obtained by a comparative outgassing test procedure in which the cured product is maintained at 125° C. for 24 hours in a vacuum of $10^{-6}$ torr and the condensation of the volatile materials occurs on a collector plate kept at 25° C. within the vacuum system.

The novel polydimethylsiloxane resin is obtained by vacuum distillation or by stripping, in a particular manner, a starting polydimethylsiloxane resin consisting essentially of three oligomers: a first oligomer having a weight average molecular weight, $\overline{M}_w$, of about 1,450 to 2,450 and a number average molecular weight, $\overline{M}_n$, of about 1,500 to 2,500; a second oligomer having a weight average molecular weight, $\overline{M}_w$, of 8,000 to 10,000 and a number average molecular weight, $\overline{M}_n$, of about 7,800 to 9,800; and a third oligomer having a weight average molecular weight, $\overline{M}_w$, of about 1,020,000 to 1,040,000 and a number average molecular weight, $\overline{M}_n$, of about 440,000 to 460,000. The viscosity at 25° C., of the polydimethylsiloxane starting resin falls within the range of about 900 to 2,000 centipoises. A commercially available polydimethylsiloxane resin which meets these criteria and which is a suitable starting material for the present invention is RTV 602, a product of General Electric Company.

The polydimethylsiloxane resin of the invention and the starting polydimethylsiloxane resin are both characterized by being essentially free of volatile terminal vinyl group-containing materials when subjected to vacuum and elevated temperatures. Unlike the polydimethylsiloxanes of the invention, however, the starting resin does not possess the low outgassing of less than 1% by weight and condensables of less than .1% by weight.

In accordance with the vacuum distillation method of the invention, the starting polydimethylsiloxane resin is poured directly into a suitable container such as a glass, aluminum or stainless steel container to a height of up to 2 inches, preferably up to 0.5 inch. (Use of plastic-type containers is not recommended since they could lead to contamination of the resin to be devolatilized.) The height to which the starting polydimethylsiloxane resin is poured, prior to the devolatilization, is an important feature of the method of the invention since heights in excess of about 2 inches have been found to lead to products which, upon curing, possess unacceptable outgassing characteristics, i.e., a total outgassing by weight greater than 1% and condensibles at room temperature of greater than 0.1%. The starting polydimethylsiloxane resin, at the defined height, is then devolatilized at a temperature of about 125° to 150° C. under a vacuum of at least $10^{-5}$ torr for a time sufficient to provide a devolatilized polydimethylsiloxane resin product having an $\overline{M}_w$ and $\overline{M}_n$ as described previously.

Temperatures used for the devolatization beyond 150° C. should ordinarily be avoided since they are likely to lead to degradation of the desired polymer product and the formation of undesirable by-product polymeric materials. On the other hand, the employment of temperatures below about 125° C. are incapable of providing the necessary stripping. Any heating device such as a resistance heater capable of delivering temperatures in this range can be used to effect the necessary devolatization temperatures.

The vacuum under which the devolatilization is effected should not be less than about $10^{-5}$ torr since under such vacuums insufficient stripping is obtained. There is no objection, however, to the use of better vacuums, for instance, up to $10^{-8}$ torr or better. In fact, the use of the more efficient vacuums offers the advantage of greater yields of desired products at a faster rate. For instance, with the more efficient vacuums a larger volume of the starting material can be used, that is, a starting material can be poured for instance to heights of say up to 2 inches; and, therefore, larger quantities of the desired product could be obtained in a shorter time. Any of the conventional vacuum chambers or equipment known to achieve these defined levels of vacuum are suitable for use in the method of the invention.

The devolatilization or treating time employed in the method of the invention will depend primarily upon the particular vacuum, temperature and height of the starting material selected. In general, when a vacuum of about $10^{-5}$ or $10^{-6}$ torr is used, a treating time of about 16 hours or more, preferably about 24 hours, will provide the desired end product. For all practical purposes, a treating time greater than about 48 hours are usually avoided not only for economic reasons but also because such times may contribute adverse effects on the desired product as, for instance, by reducing pot life or unnecessarily increasing viscosity. The use of better vacuums such as $10^{-7}$ torr could enable the production of a desired product in shorter periods of time for instance about 8 or 10 hours.

The following example is included to further illustrate the preparation of the polydimethylsiloxane resin of the invention. In the example the $\overline{M}_n$ and $\overline{M}_w$ determinations of the starting material and of the end product were made by Gel Permeation Chromatography.

EXAMPLE

RTV–602 silicone resin, a polydimethylsiloxane resin product of General Electric Company, was poured directly into a glass container to a height of 0.5 inch. More particularly, the RTV–602 silicone resin consists essentially of three oligomers: a first oligomer having a $\overline{M}_w$ of 1,953 and a $\overline{M}_n$ of 2,000; a second oligomer having an $\overline{M}_w$ of 9,000 and a $\overline{M}_n$ of 9,000; and a third oligomer having a $\overline{M}_w$ of 450,000 and a $\overline{M}_n$ of 1,030,000.

It might be well to note here that the RTV–602 silicone resin when mixed with 0.25% SRC–05 activator (a primary amine curing agent) and cured for seven days at room temperature exhibits a total outgassing of 3.10% by weight when tested at 125° C. for 24 hours in a vacuum of $10^{-6}$ torr and condensables of 0.96% when condensed on a collector plate at 25° C. within the vacuum system.

The glass container with the RTV–602 silicone resin was then placed on a resistance heater set to deliver a temperature of $150 \pm 2°$ C. The entire unit was then put into a vacuum chamber provided with a liquid nitrogen trap and a thermocouple to read out temperature. The chamber was evacuated to provide a vacuum of $10^{-6}$ torr, after which heating was started. The thermal/vacuum was continued under these conditions for 24 hours and the volatiles removed by vacuum and heat.

The resulting fluid resin was found upon analysis to consist essentially of three oligomers: a first oligomer having a $\overline{M}_w$ of about 2,356 and an $\overline{M}_n$ of 3,037; a second oligomer having an $\overline{M}_w$ of 11,000 and an $\overline{M}_n$ of 20,500 and a third oligomer having a $\overline{M}_w$ of 1,790,000 and an $\overline{M}_n$ of 861,000. Further, upon mixing, curing and testing for outgassing and condensibles, in the manner described above for the starting material RTV-602 silicone resin, the resulting fluid resin was found to exhibit a total outgassing of 0.37% by weight and a condensible of 0.02% by weight. This represented a significant reduction in outgassing and condensibles over the starting material.

Accordingly, the novel polydimethylsiloxane resin of the invention can be successfully employed in aerospace environment in a number of ways. For instance, it can be employed per se or together with other materials as paint bases, adhesives, coating compositions, potting compositions, sealants and the like.

As aforementioned, the polydimethylsiloxane resin of the invention or materials containing it are cured at room temperature utilizing the conventional primary amine curing agents for polydimethylsiloxanes. It is to be pointed out, in many applications, elevated temperatures are permissible. In such instances, curing time can be greatly reduced without loss of the improved outgassing properties.

Although the foregoing disclosure relates to preferred embodiments of the invention, it should be understood that numerous modifications or alterations may be made therein without departing from the spirit and scope of the invention as set forth in the appended claims.

It is claimed:

1. A fluid polydimethylsiloxane resin, characterized in being essentially free of volatile terminal vinyl group-containing materials and having a viscosity range at 25° C. of about 1,500 to 4,000 centipoises, consisting essentially of: a first polydimethylsiloxane oligomer having a weight average molecular weight, $\overline{M}_w$, of about 1800 to 2900 and a number average molecular weight, $\overline{M}_n$, of about 1500 to 2500; a second polydimethylsiloxane oligomer having a weight average molecular weight, $\overline{M}_w$, of about 10,000 to 12,000 and a number average molecular weight $\overline{M}_n$ of 19,500 to 21,500; and a third polydimethylsiloxane oligomer having a weight average molecular weight, $\overline{M}_w$, of about 1,780,000 to 1,800,000 and a number average molecular weight, $\overline{M}_n$, of about 850,000 to 870,000.

2. The fluid polydimethylsiloxane resin of claim 1 wherein said first polydimethylsiloxane oligomer has a weight average molecular weight, $\overline{M}_w$, of about 2,356 and a number average molecular weight, $\overline{M}_n$ of about 3,037; said second polydimethylsiloxane oligomer has a weight average molecular weight, $\overline{M}_w$, of about 11,000 and a number average molecular weight $\overline{M}_n$, of about 20,500; and said third polydimethylsiloxane oligomer has a weight average molecular weight, $\overline{M}_w$, of about 1,790,000 and a number average molecular weight, $\overline{M}_n$, of about 861,000.

3. A process for the preparation of a polydimethylsiloxane resin, characterized in being essentially free of volatile terminal vinyl group-containing materials, having a viscosity range at 25° C. of about 1,500 to 4,000 centipoises, and having low outgassing characteristics upon curing, comprising the steps of: pouring to a height of up to about 2 inches a starting polydimethylsiloxane resin consisting essentially of three polydimethylsiloxane oligomers: a first polydimethylsiloxane oligomer having a weight average molecular weight, $\overline{M}_w$, of about 1,450 to 2,450 and a number average molecular weight, $\overline{M}_n$, of about 1,500 to 2,500; a second polydimethylsiloxane oligomer having a weight average molecular weight, $\overline{M}_w$, of about 8,000 to 10,000 and a number average molecular weight, $\overline{M}_n$, of about 7,800 to 9,800; and a third polydimethylsiloxane oligomer having a weight average molecular weight, $\overline{M}_w$, of about 1,020,000 to 1,040,000 and a number average molecular weight, $\overline{M}_n$, of about 440,000 to 460,000; and devolatilizing said starting polydimethylsiloxane resin at a temperature of about 125 to 150° C. under a vacuum of at least $10^{-5}$ torr for a time sufficient to provide a resultant fluid polydimethylsiloxane resin consisting essentially of three polydimethylsiloxane oligomers: a first polydimethylsiloxane oligomer having a weight average molecular weight, $\overline{M}_w$, of 1800 to 2900 and a number average molecular weight, $\overline{M}_n$, of about 1500 to 2500; a second polydimethylsiloxane oligomer having a weight average molecular weight, $\overline{M}_w$, of about 10,000 to 12,000 and a number average molecular weight, $\overline{M}_n$, of 19,500 to 21,500; and a third polydimethylsiloxane oligomer having a weight average molecular weight, $\overline{M}_w$, of about 1,780,000 to 1,800,000 and a number average molecular weight, $\overline{M}_n$, of about 850,000 to 870,000.

4. The process of claim 3 wherein said starting polydimethylsiloxane resin is poured to a height of about 0.5 inch and the devolatilization is conducted under a vacuum of about $10^{-5}$ to $10^{-6}$.

5. The method of claim 4 wherein the period of devolatilization is at least 16 hours.

6. The method of claim 5 wherein the devolatilization period is about 24 hours.

7. An article of manufacture for use in an aerospace environment comprising a substrate having, upon at least a portion thereof, a layer of a composition comprising the polydimethylsiloxane resin of claim 1 cured utilizing conventional primary amine curing agents for polydimethylsiloxanes.

References Cited

UNITED STATES PATENTS 3,481,898  12/1969  Davies et al. _____ 260—465

OTHER REFERENCES

Noll Chemistry and Technology of Silicones, Academic Press, New York, p. 13, 1968.

DONALD E. CZAJA, Primary Examiner

M. I. MARQUIS, Assistant Examiner

U.S. Cl. X.R.

117—161 ZA; 260—46.5 G, 448.2 R, 448.2 E, 825